Dec. 26, 1950  J. W. KELLEY ET AL  2,535,799
FILTER WITH EXPLOSION-PROOF ILLUMINATING DEVICE
Filed Aug. 31, 1946
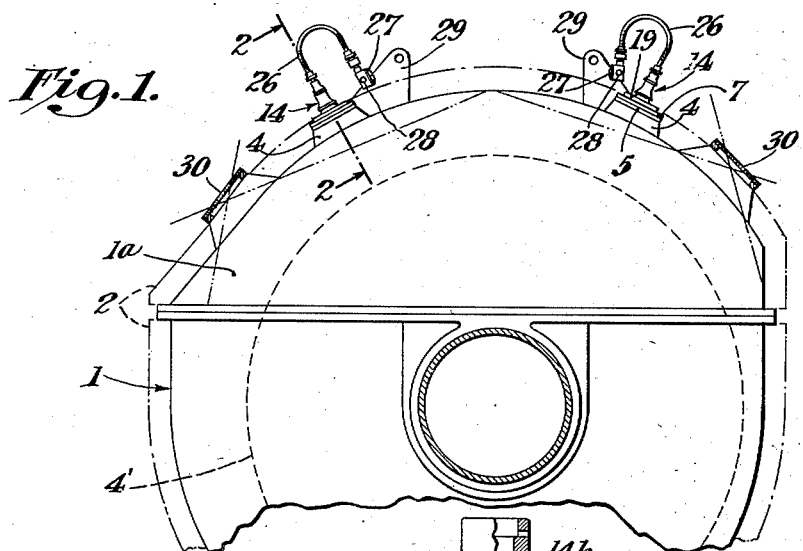
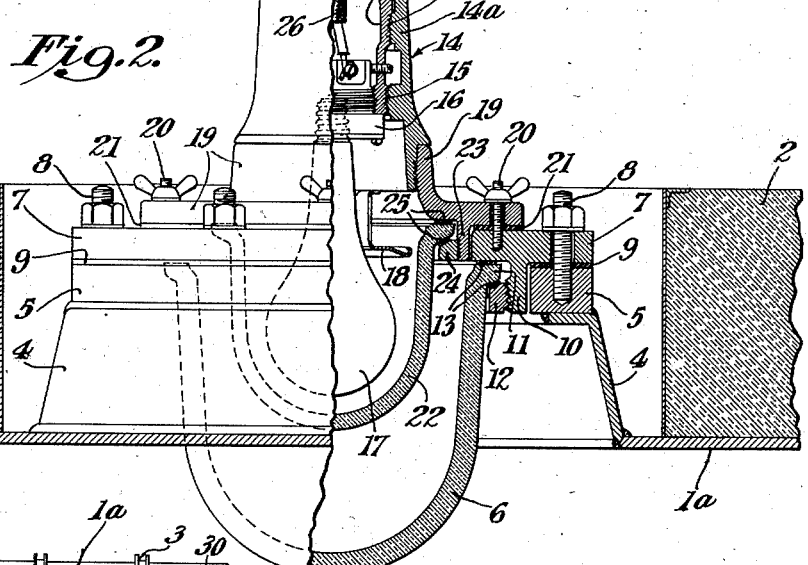
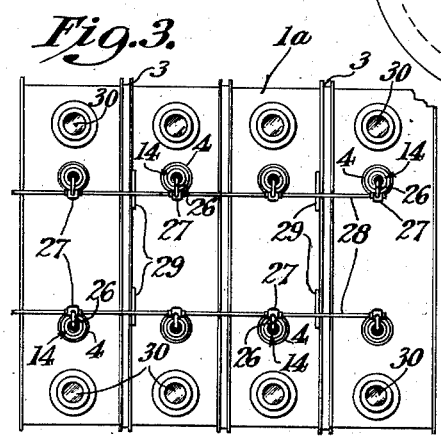
INVENTORS
John W. Kelley and
Hyman R. Davis
BY Nathaniel Ely
ATTORNEY Patented Dec. 26, 1950

2,535,799

UNITED STATES PATENT OFFICE 2,535,799

FILTER WITH EXPLOSION-PROOF ILLUMINATING DEVICE

John W. Kelley, Eastchester, and Hyman R. Davis, Jackson Heights, N. Y., assignors to The Lummus Company, New York, N. Y., a corporation of Delaware Application August 31, 1946, Serial No. 694,260

2 Claims. (Cl. 240—2)

This invention relates primarily to improvements in a filter apparatus of a type commonly employed in a petroleum dewaxing operation, for example, and wherein a filter rotor is operated within a casing in which the required operating conditions are maintained. More particularly, the invention is concerned with visual inspection of the filtering operation performed by such an apparatus.

An important object of the invention is to provide means to facilitate observation of the filtering operation and more particularly observation of the filter cake build-up upon the rotor and the application of wash liquid.

A further object of the invention is to provide for such purpose illuminating means of improved construction and arrangement together with observation ports arranged with relation to the illuminating means and the filter rotor to afford convenient observation and maximum visibility.

A further object of the invention is to provide, for a filter casing or other vessel in which there is performed an operation involving the presence of an explosive vapor, an improved illuminating means designed to safeguard the vapor from ignition.

A still further object of the invention is to provide an illuminating means designed to prevent great temperature difference between opposite faces of glass parts thereof and thereby avoid severe stress and possible fracture of the glass.

These and other objects and advantages of the invention will appear from the following description taken in connection with the accompanying drawing.

In the drawing:

Fig. 1 is a partial end view of a filter apparatus embodying the invention, parts being in section;

Fig. 2 is an enlarged detail sectional view on the line 2—2 of Fig. 1, parts being in elevation; and Fig. 3 is a top plan view of the filter casing showing the arrangement of the illuminating devices and the observation ports.

Heretofore, provision for internal illumination of filters of the aforesaid type have been deficient in both visibility and safety. It has been common to locate the illuminating means at the ends of the drum-like filter casing. In that location the light rays are cast upon the periphery of the rotor or the filter cake thereon at quite a low angle so that the illumination of the filter cake is very inefficient. Visibility is further reduced by mist within the casing. Filters of the present type are sometimes twenty feet long and in that case when the casing is illuminated at the ends only the light fails to penetrate the mist through the long distance between the ends of the casing.

The illuminating devices employed heretofore are also deficient in safety in that they lack protection of glass parts thereof from breakage due to difference in temperature at opposite faces of said parts.

According to the present invention, the illuminating devices are mounted upon the top portion of the filter casing directly over the enclosed filter rotor and are disposed to direct the light rays directly upon and substantially normal to the peripheral surface of the rotor. The devices are also distributed to provide substantially uniform illumination of the upper half of the peripheral area of the rotor. Observation ports are also provided upon the upper portion of the casing and in such arrangement with relation to the rotor and the illuminating devices as to render said area conveniently observable and clearly visible through the ports.

The illuminating devices are also provided with a multiple glass dome or globe construction and with sealing connections which entirely exclude vapor of the filtration zone from the electrical connections and prevent ignition of the vapor by sparks. The globes are also arranged and connected in such manner as to insulate them against severe temperature stresses and also prevent objectionable clouding of the domes by condensation thereon. Provision is also made for removal of the lamp and one of the domes as a unit and leaving a companion dome attached to the filter casing to serve as a closure therefor while the removed lamp and its globe are being serviced.

The invention is shown embodied in a filter including a drum-like horizontal casing 1 having a removable upper section or hood 1a. The casing includes a covering 2 of heat insulation and reinforcing channel strips 3 extending around the casing and spaced therealong. A filter rotor 4' is mounted within the casing for rotation about a horizontal axis. The casing is constructed to form a gas-tight enclosure for the filtration zone therein. In general, the filter is of a conventional construction and detailed illustration and description thereof is considered unnecessary.

Two rows of illuminating devices are mounted upon the hood section of the casing in symmetrical arrangement at opposite sides of a vertical longitudinal central plane. The casing has apertures receiving said devices and each aperture is defined by a frame structure comprising an outwardly tapered ring 4 welded at its inner edge to the casing and formed at its outer edge with an inturned flange upon which a frame ring 5 is welded.

The illuminating devices are all of similar construction and each includes a dome-shaped globe 6 of transparent material projecting inwardly through one of the said casing apertures and supported by a flat ring 7. This ring overlaps the frame ring 5, and is bolted thereto, as at 8, a compressible gasket 9 being interposed between said rings. Inwardly of the ring 5, the ring 7 has a depending annular flange 10 which is internally screw-threaded. Globe 6 has a base flange 11 clamped to the under face of the ring 7 by an externally threaded ring 12 screwed into the flange 10 of said ring, compressible gaskets 13 being interposed between said globe flange and the rings 7 and 12. A lamp unit 14 is mounted upon the ring 7. This unit comprises a shell formed of telescoped sections 14a and 14b in screw-threaded connection, as at 15. A lamp socket 16 is in screw-threaded connection with the lower end of the inner section 14b of the shell, and an electric lamp 17 is in screw-threaded connection with said socket. An annular reflector 18 surrounds the lamp and is supported by the inner shell section. The details of the supports are not shown. The outer shell section 14a is externally threaded at its lower end and an internally screw-threaded base ring 19 for the unit is screwed thereon. This base ring has a flat flange overlapping the ring 7 and bolted thereto, as at 20, wing nuts being employed. A compressible gasket 21 is interposed between said flange and the ring 7. A dome-shaped inner globe 22 of transparent material for the lamp is borne by the ring 19. The latter has a depending annular flange 23 inwardly of the ring 7 and internally screw-threaded. The globe 22 has a base flange within the ring flange 23 and opposed to the under face of the ring 19. An externally threaded ring 24 is screwed into the flange 23 to clamp the base flange of the globe 22 to the ring 19. Compressible gaskets 25 are interposed between said globe flange and the rings 19 and 24. Preferably the globes are made of explosion-proof glass comprising a commercially known composition.

The lamp socket of each lamp unit has electrical wiring 26 releasably connected, as at 27, to a pair of electrical conduits 28 which supply current for the lamps. The latter are supported by upstanding ears 29 on the hood section of the casing and extend alongside of the respective rows of illuminating devices.

The hood section of the casing is provided with glass-covered observation ports 30 arranged in two rows alongside of the respective rows of illuminating devices and spaced outwardly therefrom. Each port is disposed adjacent a respective one of the lamps and on a line substantially normal to the peripheral surface of the rotor and the port is so formed and arranged as to render the entire upper half of the peripheral surface of the rotor observable therethrough. The illuminating devices direct light rays at a steep angle upon said surface and the observation ports are arranged to receive rays reflected at a steep angle from said surface, for maximum visibility.

During operation of the filter, the filter cake and wash liquid application upon the rotor may be readily observed through the observation ports. Clear visibility of the cake is obtained by the arrangement of the ports and by the arrangement of the illuminating devices so that the light therefrom is cast substantially radially toward the rotor and is distributed substantially uniformly over the upper surface of the rotor. Proper performance of the filtering operation is thereby facilitated as the operator may readily inspect the cake and the washing operation and make the corrections required to obtain a proper cake build-up and proper application of the wash liquid.

Maximum safety is also provided for. It is common in petroleum dewaxing processes to employ solvents such as benzol, toluene, and methyl ethyl ketone whose vapors are explosive. The sealing connections between the outer globe 6 and the casing and also between the two globes effectually prevents escape of the explosive vapor from the filtration zone. Such vapor is prevented from escaping to atmosphere and also from passing into the space between the globes. Said space is also sealed from the external atmosphere and forms a dead air pocket for heat insulation and prevention of severe stress in the glass of the globes. In the dewaxing operation, a low temperature within the neighborhood of 0° F. is maintained within the filtration zone and were it not for the provision of the guard globe 6, the globe 22 would be subjected at its outer face to said low temperature and at its inner face to high temperature caused by the lamp. Consequent stress set up within the glass would render the globe liable to fracture. The inner globe and the dead air space between the globes materially reduces the stress within the globe 22. At the same time, dangerous stress within the globe 6 is prevented by the insulating dead air space which reduces the temperature at the inner face of said globe to a safe limit. Deposit of condensation upon the globes with consequent clouding thereof and reduction of illumination is also greatly reduced.

When servicing of any one of the lamp units is required the unit may be readily released from the ring 7 by unscrewing the wing nuts. Then the unit may be removed without disturbing the globe 6 and its sealing connections which remain in place to maintain the filter casing closed and sealed.

While we have disclosed a satisfactory embodiment of our invention, in a rotary filter apparatus, the utility thereof is by no means so limited. Features of the invention may be employed to advantage in services other than filtration. It is to be understood therefore that the present disclosure is illustrative and in nowise limiting and that the invention comprehends such modifications as will come within the scope of the following claims.

We claim:

1. In a rotary filter apparatus including a casing and a filter rotor therein mounted for rotation about a substantially horizontal axis, the upper portion of said casing being of inverted trough form and substantially concentric with the periphery of the rotor; an illuminating device including a lamp borne by said upper portion of the casing at one side of the axis of said rotor and in opposition to the upper portion of the periphery of the rotor and arranged to cast rays substantially radially thereon; said device comprising an inner and an outer dome of transparent material in spaced nested relation to each other, a mounting for the outer dome forming a gas-tight sealing connection between the base thereof and the casing, means detachably mounting the inner dome upon said mounting of the outer dome with the base of the inner dome accessible from without the filter casing, and a mounting supporting the lamp in said inner dome with the lamp projecting through the base thereof; and an observation port with a cover of transparent material, borne by said portion of the casing at said side of the rotor axis and in radial opposition to the periphery of the rotor for observation of the illuminated area of the rotor.

2. In a rotary filter apparatus including a casing and a filter rotor therein mounted for rotation about a substantially horizontal axis, the upper portion of said casing being of inverted trough form and substantially concentric with the periphery of the rotor; illuminating devices each including a lamp, said devices being borne by said portion of the casing and spaced therealong axially of the rotor and in opposition to the upper portion of the periphery of the rotor and arranged to cast rays substantially radially thereon; each of said devices further comprising an inner and an outer dome of transparent material in spaced nested relation to each other, a mounting for the outer dome forming a gas-tight sealing connection between the base thereof and the casing, means detachably mounting the inner dome upon said mounting of the outer dome with the base of the inner dome accessible from without the filter casing, and a mounting supporting the electric lamp in said inner dome with the lamp projecting through the base thereof; and observation ports, with covers of transparent material borne by said portion of the casing and spaced therealong axially of the rotor and in radial opposition to the periphery of the rotor for observation of the illuminated area of the rotor.

JOHN W. KELLEY.
HYMAN R. DAVIS.

REFERENCES CITED

The following references are of record in the file of this patent:

UNITED STATES PATENTS

| Number | Name | Date |
|---|---|---|
| 1,247,155 | Russell | Nov. 20, 1917 |
| 1,264,143 | Bennett | Apr. 30, 1918 |
| 1,286,159 | Voss | Nov. 26, 1918 |
| 1,640,512 | Mitchell | Aug. 30, 1927 |
| 1,676,576 | Ruemelin | July 10, 1928 |
| 1,879,098 | Coffey | Sept. 27, 1932 |
| 1,984,513 | Angelus et al. | Dec. 18, 1934 |
| 1,989,443 | Arnold | Jan. 19, 1935 |
| 2,330,935 | Tuck | Oct. 5, 1943 |
| 2,394,016 | Schutte et al. | Feb. 5, 1946 |
| 2,445,072 | Lee | July 13, 1948 |
| 2,447,922 | Tuck | Aug. 24, 1948 |

FOREIGN PATENTS

| Number | Country | Date |
|---|---|---|
| 216,423 | England | May 29, 1924 |
| 264,037 | Germany | 1912 |
| 502,150 | England | 1939 |
| 489,009 | Germany | Jan. 11, 1930 |